United States Patent
Brenner et al.

(10) Patent No.: US 8,657,266 B2
(45) Date of Patent: Feb. 25, 2014

(54) SEPARATOR ROLL MEMBRANE COATING FOR FUEL CELL HUMIDIFIER

(75) Inventors: Annette M. Brenner, Honeoye Falls, NY (US); Timothy J. Fuller, Pittsford, NY (US); Lijun Zou, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 391 days.

(21) Appl. No.: 13/208,410

(22) Filed: Aug. 12, 2011

(65) Prior Publication Data

US 2012/0217661 A1    Aug. 30, 2012

Related U.S. Application Data

(60) Provisional application No. 61/447,212, filed on Feb. 28, 2011.

(51) Int. Cl.
*B01F 3/04* (2006.01)

(52) U.S. Cl.
USPC .......................................... 261/100; 429/413

(58) Field of Classification Search
USPC ............ 261/100, 101, 102; 429/413; 156/60, 156/278, 280, 308.6
See application file for complete search history.

(56) References Cited

U.S. PATENT DOCUMENTS

| | | | |
|---|---|---|---|
| 7,749,661 B2 | 7/2010 | Zhang et al. | |
| 7,875,396 B2 | 1/2011 | Zhang et al. | |
| 8,091,868 B2 * | 1/2012 | Robb et al. | 261/101 |
| 2009/0092863 A1 | 4/2009 | Skala | |
| 2013/0022897 A1 * | 1/2013 | Martinchek et al. | 429/516 |

* cited by examiner

*Primary Examiner* — Robert A Hopkins
(74) *Attorney, Agent, or Firm* — Dinsmore & Shohl LLP (57) ABSTRACT

A water vapor transfer unit with separator plates and a method of making the same. In such an assembly, an ionomer coating that facilitates moisture transfer from a moisture-rich flowpath to a moisture-deficient flowpath and an underlying separator may both be prepared from continuous, roll-based methods. The ionomer may be applied to a separator assembly as the last processing step such that the handling of the fragile membrane is kept to a minimum.

20 Claims, 8 Drawing Sheets

SEPARATOR ROLL MEMBRANE COATING FOR FUEL CELL HUMIDIFIER

CROSS-REFERENCE TO RELATED APPLICATIONS

This application claims the benefit of U.S. Provisional Application Ser. No. 61/447,212, filed Feb. 28, 2011.

BACKGROUND OF THE INVENTION

This invention relates generally to a way to improve a fuel cell humidifier unit, and more particularly to the construction of a water-permeable membrane within the humidifier and a method for making the same.

In many fuel cell systems, hydrogen or a hydrogen-rich gas is supplied through a flowfield to the anode side of a fuel cell while oxygen (such as in the form of atmospheric oxygen) is supplied through a separate flowfield to the cathode side of the fuel cell. An appropriate catalyst (for example, platinum) is typically disposed as a layer on porous diffusion media that is typically made from a carbon fabric or paper such that the combination exhibits resiliency, electrical conductivity, and gas permeability. The catalyzed diffusion media is used to facilitate hydrogen oxidation at the anode side and oxygen reduction at the cathode side. An electric current produced by the dissociation of the hydrogen at the anode is passed from the catalyzed portion of the diffusion media and through a separate circuit such that it can be the source of useful work, while the ionized hydrogen passes through another medium situated between the diffusion media of the anode and cathode. Upon such passage, the ionized hydrogen combines with ionized oxygen at the cathode to form high temperature water vapor as a reaction byproduct. In one form of fuel cell, called the proton exchange membrane or polymer electrolyte membrane (in either event, PEM) fuel cell, the medium for ionized hydrogen passage is an electrolyte in the form of a perfluorinated sulfonic acid (PFSA) ionomer membrane (such as Nafion®). This layered structure of the membrane surrounded on opposing sides by the catalyzed diffusion media is commonly referred to as a membrane electrode assembly (MEA), and forms a single fuel cell. Many such single cells can be combined to form a fuel cell stack, increasing the power output thereof.

Fuel cells, particularly PEM fuel cells, require balanced water levels to ensure proper operation. For example, it is important to avoid having too much water in the fuel cell, which can result in the flooding or related blockage of the reactant flowfield channels. On the other hand, too little hydration limits the electrical conductivity of the membrane and can lead to premature cell failure. Increasing the difficulty in maintaining a balance in water level is that there are numerous conflicting reactions taking place in a fuel cell that are simultaneously increasing and decreasing local and global hydration levels.

One potential method of ensuring adequate levels of hydration throughout the fuel cell includes humidifying one or both of the reactants before they enter the fuel cell. For example, residual water present at the cathode exhaust can be used with an appropriate humidification device to reduce the likelihood of dehydration of the anode, the PFSA ionomer membrane, or the cathode inlet. One such humidification device is a water vapor transfer (WVT) unit, which may also be referred to as a membrane humidifier, fuel cell humidifier, or related assembly. The WVT unit extracts the moisture from a humid fuel cell exhaust flowpath and places it into the feed path of a reactant low in humidity. Wet-side and dry-side reactant flowpaths (for example, a cathode exhaust and a cathode inlet) are in moisture-exchange communication with one another in the WVT unit through one or more separators (also known as separator plates). In a particular manufacturing approach, the separator is formed continuously as a roll with a pair of planar porous layers and a support layer spaced apart by elongated strings placed between them. From this continuous roll, the WVT unit can be cut into sizes and shapes needed for a particular fuel cell application. Examples of WVT units may be found in U.S. Pat. Nos. 7,749,661 and 7,875,396, as well as US Published Patent Application 2009/0092863, all of which are assigned to the assignee of the present invention and the entire contents of which are herein incorporated fully by reference.

The exchange of humidity is generally accomplished in the WVT unit by using an ionomer membrane disposed between adjacent high humidity and low humidity fluid flowpaths formed in the separators. The generally planar membrane (which may structurally resemble that of the PFSA membrane discussed above) allows water vapor to pass from the higher humidity fluid on one side to the lower humidity fluid on the other while inhibiting the direct mixing of the two fluids, for example, the cathode inlet and cathode exhaust that are being conveyed through the flowpaths. In one form of construction, the ionomer membrane is attached to an adjacent support layer (which may be a thin layer of expanded poly(tetrafluoroethylene) (ePTFE) or related material) to increase the robustness and handleability of the membrane and support, as well as to avoid migration of the ionomer into a porous separator. Despite such layering, the combination remains fragile where, in one typical form, the ionomer membrane may be between 3 and 10 microns thick, while the support (made, for example, from expanded poly(tetrafluoroethylene) (ePTFE)) may be about 10 to 30 microns thick.

Existing processes associated with WVT unit fabrication may expose the ionomer membrane and support to excessive handling and related harsh conditions that could jeopardize membrane integrity through failure modes such as crossover. Likewise, existing processes that end up scrapping significant portions of ionomer membrane result in waste and related cost increases. As stated above, the separator is produced in roll form; in such form, the ionomer membrane is on a supporting layer of backer material which must be removed as part of the separator plate manufacturing process. These features significantly contribute to the overall cost of incorporating ionomer membranes into the WVT unit. As such, approaches that would reduce both the handling and cost issues associated with such membrane material are preferred.

SUMMARY OF THE INVENTION

According to an aspect of the present invention, WVT units (as well as assemblies made therefrom) can simultaneously be made more durable and less expensive. In particular, the manufacture of the separators that are stacked to form the WVT unit can be assembled in such a way that the moisture-transmissive ionomer membrane layer is affixed thereto with minimum risk of ionomer membrane layer damage. In one form of the invention, the ionomer membrane layer can be coated directly onto a separator roll as a last step (i.e., just prior to cutting the separator plates for WVT unit assembly), thereby minimizing the amount of handling of the ionomer membrane layer. In one form, the separator roll has an ePTFE support that forms a barrier between the separator's paper layer and the ionomer membrane layer being applied. More particularly, the ePTFE support layer is secured to the paper as a support bond in the form of a dry bond (for the dry side) or a wet bond (for the wet side) through any known method, such as thermal or adhesive means. Upon attachment of the ionomer membrane to the respective top or bottom surface of the dry or wet bond layer, the resulting layered structure could then be directly die cut and stacked for final assembly. Such construction helps reduce the handling of the membrane in order to reduce crossover. Furthermore, the direct attachment of the ionomer membrane eliminates the need for a backer; this helps reduce waste. In a more particular form, a second ePTFE layer may be wet laminated on the separator, or on an opposite separator that already has bonded ePTFE to promote additional durability.

BRIEF DESCRIPTION OF THE DRAWINGS

The following detailed description of specific embodiments can be best understood when read in conjunction with the following drawings, where like structure is indicated with like reference numerals and in which:

FIGS. 2A(1), 2A(2), 2B, 2C, 2D, 2E(1), 2E(2) show the addition of an ionomer membrane to a separator using a roll process according to the prior art;

FIGS. 3A(1), 3A(2), 3B, 3C(1), 3C(2), 3C(3), 3C(4), 3C(5), 3C(6), 3D shows one embodiment of a roll process for preparing a separator by adding the ionomer membrane to the separator as a last step according to an aspect of the present invention;

FIGS. 4A(1), 4A(2), 4B(1), 4B(2), 4C(1), 4C(2), 4D(1), 4D(2), 4E(1), 4E(2), 4F(1), 4F(2), 4G(1), 4G(2) shows representative alternate embodiments of the wet and dry sides of separators of the present invention that can be used in the WVT unit of FIG. 1.

FIG. 6(1)-(2) shows an alternate embodiment of the present invention that can be used with discrete plate devices.

DETAILED DESCRIPTION OF THE INVENTION

Figure 1:
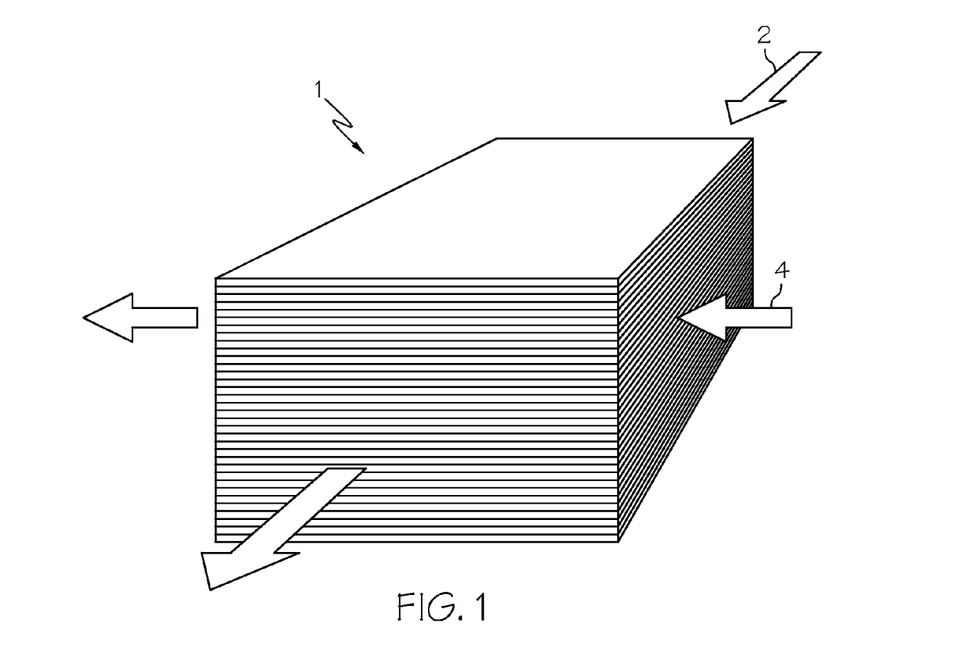
FIG. 1 shows a simplified version of a WVT unit and the humidity-exchange flowpaths therethrough.

FIG. 1 illustrates a WVT unit 1 with multiple layers of wet and dry separators for the exchange of moisture. In one form, the wet flow 2 may be that coming from a fuel cell cathode exhaust, while the dry flow 4 may be the inlet to the fuel cell cathode, although it will be appreciated that other flowpaths are also within the scope of the present invention.

FIG. 2 shows an example of one current method of making the components for a WVT unit 1. There are dry side separators 10 and wet side separators 15 as shown in FIGS. 2A(1) and (2). The dry side separators 10 have two layers of dry paper 20 separated by spacers 25. Similarly, the wet side separators 15 have two layers of wet paper 30 separated by spacers 35. The wet and dry paper can be any suitable porous material as is known to those of skill in the art. For convenience, the porous material will be referred to as paper.

The strings or spacers provide a flowpath between the two layers of porous material. It should be understood that either side could use different strings or spacers, or both sides could use the same type, if desired. The dry side separators 10 and wet side separators 15 can be made using the process shown in FIG. 2B. The upper and lower dry side paper 20 and the spacers 25 are fed into rollers 40 which seal the layers together. This process is described in US Published Application 2009/0092863, which is incorporated herein by reference.

Figure 2A:
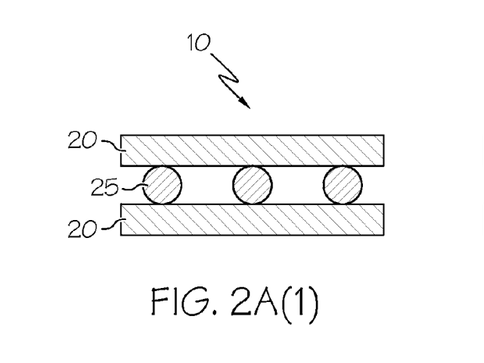
Figure 2B:
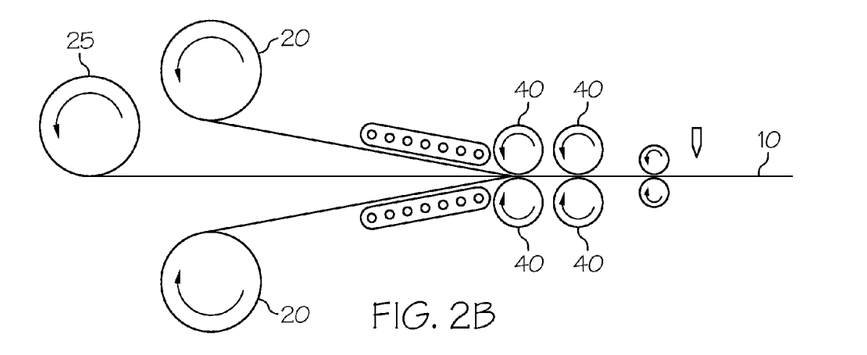
Figure 2C:
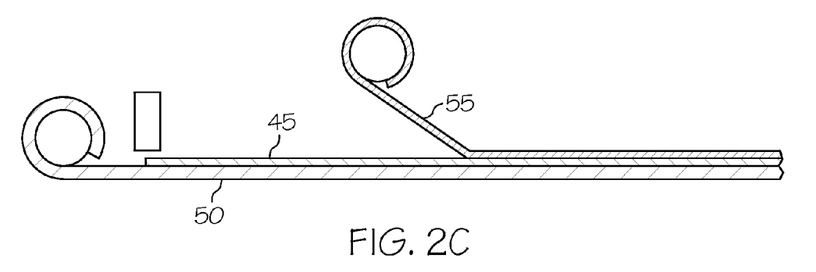

The ionomer membrane layer 45 is coated onto a backer layer 50, and support layer 55 is wet laminated to ionomer membrane layer 45, as shown in FIG. 2C.

Figure 2D:
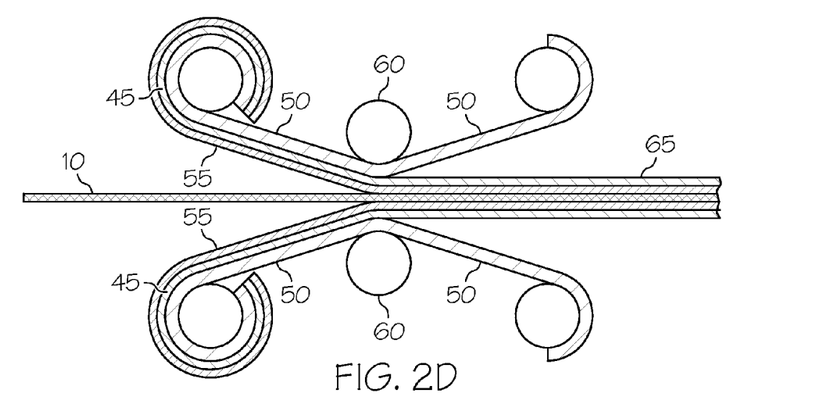
Figure 2E:
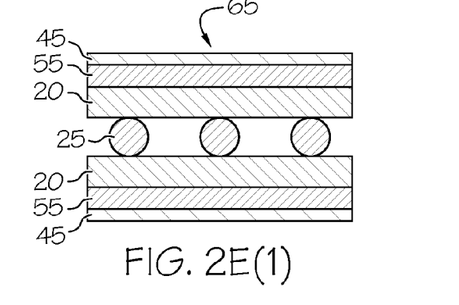

As shown in FIG. 2D, the rolls of dry side separators 10 or wet side separators 15 formed in FIG. 2B are then joined with the ionomer membrane layer structure formed in FIG. 2C. The dry side separator roll 10, for example, and the ionomer membrane layer 45 with the support layer 55 and backer layer 50 are fed into rollers 60. In one form, the support layer 55 is bonded to the diffusion media-like paper 20 or 30 using a hot melt adhesive, such as DuPont™ Bynel®. The backer layer 50 is removed, forming the coated dry side separator 65. In the same way, a coated wet side separator 70 would be formed from the wet side separator roll 15, and the ionomer membrane layer 45, support layer 55, and backer layer 50. Then the coated separators 65, 70 are die-cut to the desired form.

The coated separators 65, 70 (shown in FIGS. 2E(1) and (2) as discrete units that have already been cut to a predetermined size) may then be stacked together in a repeated cross flow fashion to form the WVT unit 1.

In a typical form, the ionomer membrane layer 45 may be between about 3 and 10 microns in thickness, while the support layer 55 is between about 10 and 30 microns in thickness, and less if compressed. The wet and dry paper is about 100 microns in thickness and, except for the catalytic and conductive function, performs in a manner generally similar to the porous diffusion media of the MEA.

In contrast, the approach to manufacturing the coated separators according to an aspect of the present invention minimizes the handling of the ionomer membrane layer 45. In the process of the present invention, the handling of ionomer membrane layer 45 is saved until the end of the fabrication process (i.e., just prior to cutting), as shown in FIG. 3. In addition, thermal processing (such as in oven 75 shown in FIG. 3D) could be used to promote adhesion of the ionomer membrane layer 45 onto the support layer 55. The nature of the roll process is such that the processing and conditions associated with making coated separators should minimize the chances of harming the ionomer membrane layer 45.

Figure 3A:
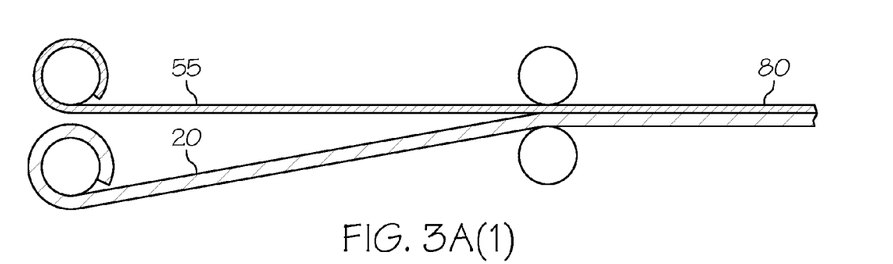
Figure 3B:
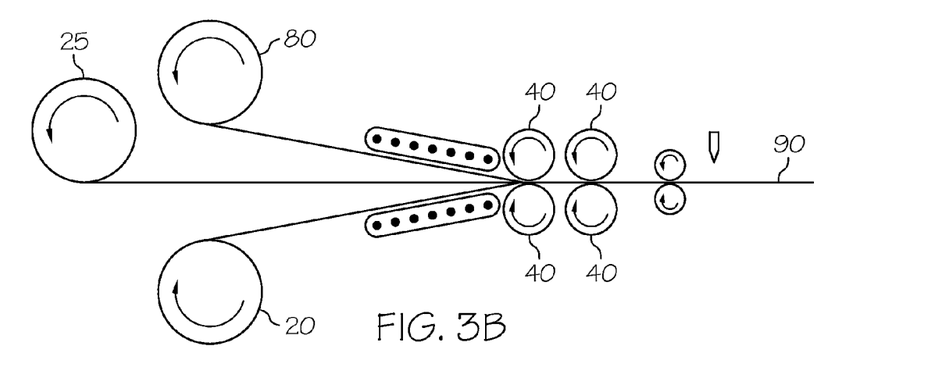
Figure 3C:
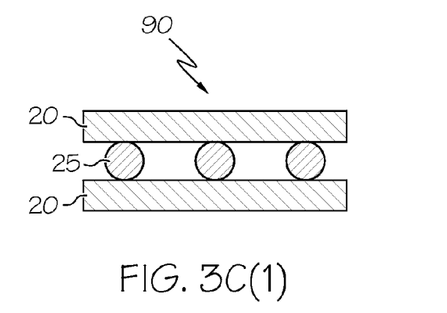

The dry side paper 20 and wet side paper 30 are adhered to the support layer 55 to form bonded layers 80, 85, as shown in FIGS. 3A(1) and (2). The bond can be formed through any known method, including using heat or adhesive, such as a hot melt adhesive. The dry and wet side separators are then formed using the method described above and shown in FIG. 3B. The upper and lower paper can be either plain paper 20, 30 or paper with the support layer attached 80, 85. Depending on which type of paper is used, a variety of dry and wet structures 90, 95 with and without the support layer 55 can be formed as shown in FIGS. 3C(1-6). There can be dry or wet paper surrounding the strings (FIGS. 3C(1) and (2)), dry or wet paper with support layer 55 on both sides (FIGS. 3C(3) and (4)), or dry or wet paper with a support layer 55 on one side (FIGS. 3C(5)-(6)).

Figure 3D:
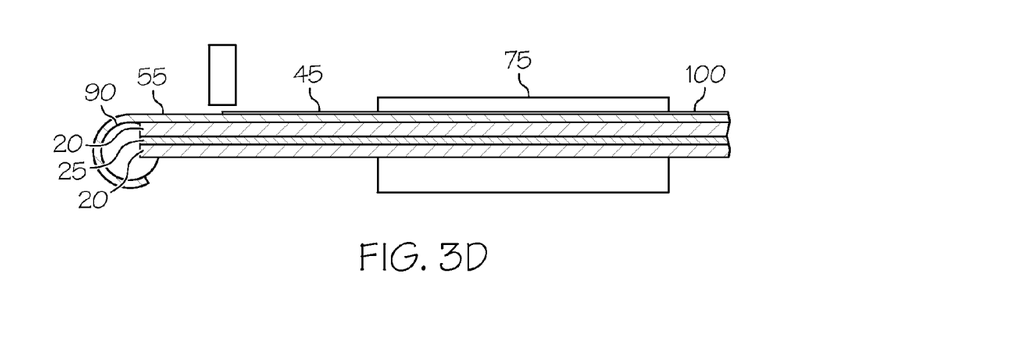
Figure 4A:
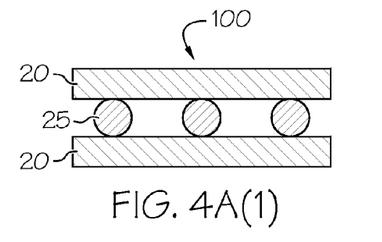
Figure 4B:
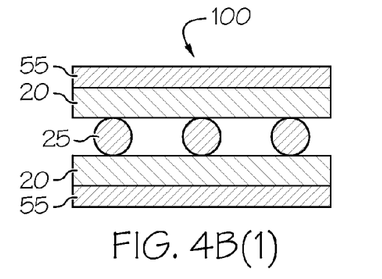
Figure 4C:
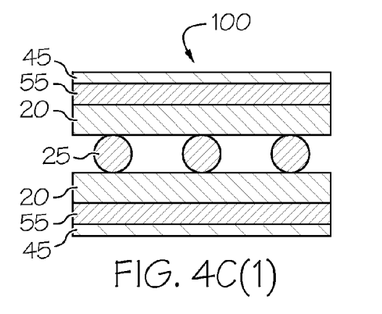
Figure 4D:
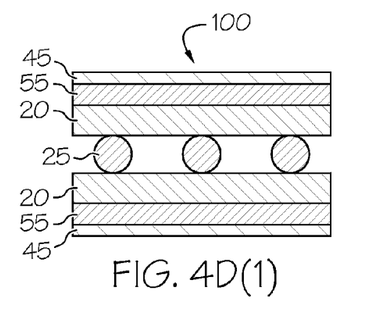
Figure 4E:
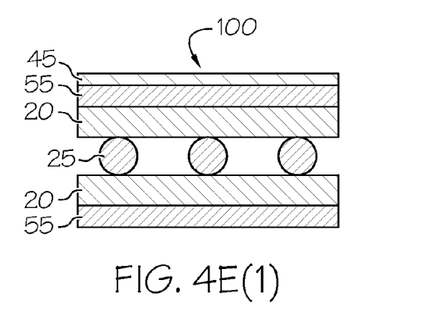
Figure 4F:
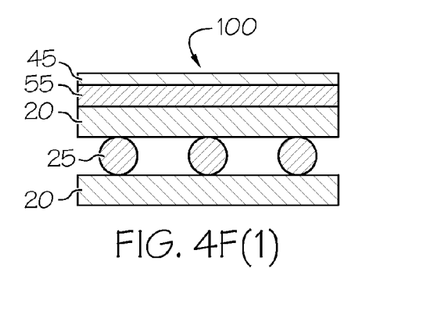
Figure 4G:
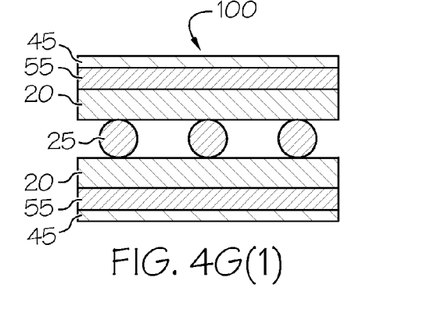

The dry and wet side structures 90, 95 with the support layer 55 can then be coated with the ionomer membrane layer 45 as shown in FIG. 3D. The coating of the ionomer membrane layer 45 on the support layer 55 can be achieved by one of numerous processes, such as slot die, reverse roll, or gravure coating methods. The coated structures 100, 105 can then be die cut as needed.

FIGS. 4(A-G) show a variety of separator subunits 100, 105 that can be formed and combined to form the WVT unit. The WVT unit is built in a cross-flow orientation with alternating dry and wet subunits 100, 105. The subunits should be arranged so that an ionomer layer exists between the dry and wet subunits 100, 105. The separators can be coated with ionomer on neither side, or one side or on both sides, and there can be a membrane support on neither side, on one side, or on both sides. When there is a support layer on both sides, the extra layer of support may provide more protection for the ionomer layer. For example, a coated wet separator 105 can be combined with a non-coated dry separator 100, with membrane support 55 only on the coated wet separator 105 as shown in FIGS. 4A(1) and (2), or with membrane support 55 on both as shown in FIGS. 4B(1) and (2). A non-coated wet separator 105 can be combined with a coated dry separator 100 with membrane support 55 only on the coated dry separator 100 as shown in FIGS. 4C(1) and (2), or with membrane support 55 on both as shown in FIGS. 4D(1) and (2). There can be one coat on both the wet and dry separators 105, 100, with membrane support 55 on both sides as shown in FIGS. 4E(1) and (2), or with membrane support 55 on only one side as shown in FIGS. 4F(1) and (2). Wet and dry separators coated on both sides can also be combined as in FIGS. 4G(1) and (2). The separators with only one side coated are likely to be easier to process because there will only be one pass through the coater. Additional embodiments are possible.

The process allows different porous layers, different ionomer layers, and/or different support layers to be used on the dry and wet sides of the WVT unit or on different sides of a subunit, if desired.

Figure 5:
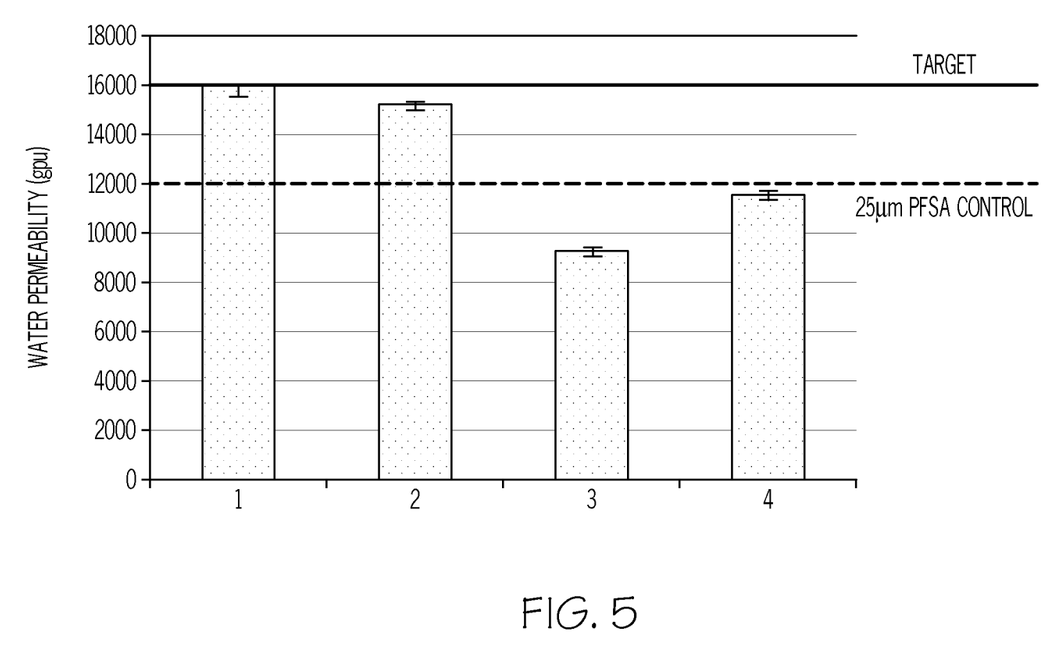
FIG. 5 is a graph comparing the water permeability performance of samples made according to the prior art and according to one embodiment of the present invention.
Figure 6:
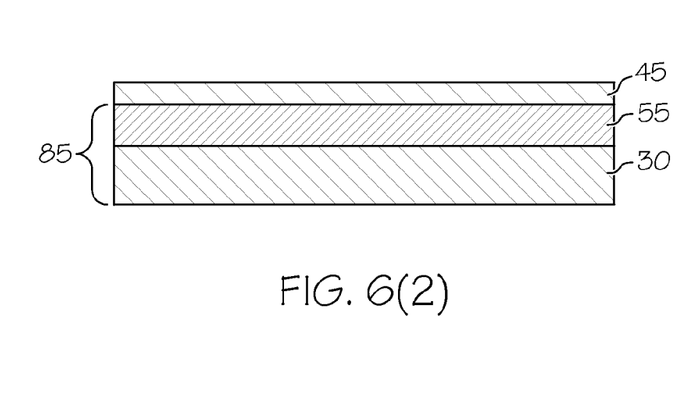

FIG. 5 is a plot of the water permeance for four different water transfer membranes. The water permeance was compared to a control sample of 25 μm homogeneous PFSA membrane of Nafion® with baseline carbon paper which had a permeance of 12,000 gpu (gas permeation units). Samples 1 and 2 were made according to the prior art process, while samples 3 and 4 were made according to the process of the present invention. Sample 1 was a hand-coated sample in which ionomer was cast on a backer material, and ePTFE was wet laminated to the ionomer. It was tested using baseline carbon paper for both wet and dry papers. Sample 2 was a roll manufactured sample made using the same process as sample 1.

Sample 3 was a hand-coated sample in which ionomer was cast on a backer material. The ePTFE support layer was thermally bonded to dry paper and the thermally bonded ePTFE/paper was wet laminated to the ionomer. It was tested with baseline carbon paper for the wet paper. Sample 4 was a hand-coated sample in which ionomer was cast directly on ePTFE thermally bonded to dry paper. It was tested with baseline carbon paper for the wet paper.

Sample 1 had a performance of about 16,000 gpu, and sample 2 was about 15,200 gpu. Sample 3 was less than the control at 9,300 gpu, and sample 4 was very near the control at 11,600 gpu.

In other studies, it was found that there is approximately a 10% reduction in performance when the selective layer is toward the wet side of the device. Therefore, ideally the ePTFE support is bonded to the wet side paper to maintain the optimal orientation. However, Samples 3 and 4 were tested with the selective layer toward the wet side of the device (Samples 1 and 2 had the desired orientation). Correcting for the non-optimal selective layer orientation, the water permeance of Sample 3 would be approximately 10,000 gpu (less than the control), and sample 4 would be about 12,700 gpu (above the control).

If additional protection of the ionomer membrane is needed, another ePTFE layer (similar to ePTFE support) can be wet laminated to the membrane, or can be present on the opposite separator when stacked. Additional optimization schemes may be implemented for additional diffusion media papers, support layers, ionomer coating and design purposes.

In another embodiment, the bonded layers 80, 85 from FIGS. 3A(1) and (2) can be coated with the ionomer membrane layer 45, as shown in FIGS. 6 (1) and (2). These structures can be used in traditional discrete plate devices, such as those described in U.S. Pat. No. 7,749,661 which is incorporated herein by reference.

The present invention provides great flexibility in making a WVT unit. The wet and dry separators can be made with different materials, and have different layers structures. The structure, and ionomer and support layers can be selected to provide the best water vapor transport for each side.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of making a component for a water vapor transfer unit comprising:
   bonding a membrane support layer to a first porous layer to form a bonded porous layer; and
   depositing an ionomer membrane layer on the membrane support layer.

2. The method of claim 1 wherein bonding the membrane support layer to the first porous layer comprises using heat or an adhesive.

3. The method of claim 1 wherein bonding the membrane support layer to the first porous layer comprises using a hot melt adhesive.

4. The method of claim 1 wherein depositing the ionomer membrane layer on the membrane support layer comprises slot die coating, reverse roll coating, or gravure coating.

5. The method of claim 1 further comprising:
   placing a layer of spacers or strings between two bonded porous layers or between the bonded porous layer and a second porous layer before depositing the ionomer membrane layer on the membrane support layer, wherein the layer of spacers or strings forms a flowpath between the two bonded porous layers or the bonded porous layer and the second porous layer.

6. The method of claim 5 wherein there are two bonded porous layers and wherein the ionomer membrane layer is deposited on both membrane support layers.

7. The method of claim 1 wherein the porous layer on one side is different from the porous layer or the second porous layer on the other side, or the support layer on one side is different from the support layer on the other side, or the ionomer membrane layer on one side is different from the ionomer membrane layer on the other side, or combinations thereof.

8. The method of claim 1 further comprising die cutting the component.

9. The method of claim 1 further comprising heating the component.

10. A method of making a component for a water vapor transfer unit comprising:
bonding a membrane support layer to a first porous layer to form a bonded porous layer;
placing a layer of spacers or strings between two bonded porous layers or between the bonded porous layer and a second porous layer, wherein the layer of spacers or strings forms a flowpath between the two bonded porous layers or the bonded porous layer and the second porous layer forming a separator; and
depositing an ionomer membrane layer on the membrane support layer after forming the separator.

11. The method of claim 10 wherein bonding the membrane support layer to the first porous layer comprises using heat or an adhesive.

12. The method of claim 10 wherein bonding the membrane support layer to the first porous layer comprises using a hot melt adhesive.

13. The method of claim 10 wherein depositing the ionomer membrane layer on the membrane support layer comprises slot die coating, reverse roll coating, or gravure coating.

14. The method of claim 10 wherein there are two bonded porous layers and wherein the ionomer membrane layer is deposited on both membrane support layers.

15. The method of claim 10 wherein the porous layer on one side is different from the porous layer or the second porous layer on the other side, or the support layer on one side is different from the support layer on the other side, or the ionomer membrane layer on one side is different from the ionomer membrane layer on the other side, or combinations thereof.

16. The method of claim 10 further comprising die cutting the component.

17. The method of claim 10 further comprising heating the component.

18. A water vapor transport unit comprising:
a wet side separator subunit having a structure comprising a separator;
a dry side separator subunit adjacent to the wet side separator unit, the dry side separator subunit having a structure comprising a separator;
wherein the structure of the wet side separator subunit or the dry side separator subunit or both further comprises an ionomer layer with a support membrane on one or both sides of the separator, the wet side separator subunit and the dry side separator subunit being positioned so that the ionomer layer is between the wet side separator subunit and the dry side separator subunit; and
wherein the structure or a material or both of the wet side separator is different from the structure or a material of the dry side separator subunit.

19. The water vapor transport unit of claim 18 wherein the structure of the wet side separator subunit or the dry side separator subunit or both further comprises a support layer on one or both sides of the separator.

20. The water vapor transport unit of claim 18 wherein the structure of the wet side separator subunit and the dry side separator subunit includes at least one ionomer layer and at least one support layer and wherein the ionomer layer of the wet side separator subunit is different from the ionomer layer of the dry side separator subunit, or the support layer of the wet side separator subunit is different from the support layer of the dry side separator subunit, or both.

* * * * *